(12) United States Patent
Li

(10) Patent No.: US 9,447,942 B2
(45) Date of Patent: Sep. 20, 2016

(54) LED CONDENSING SYSTEM AND METHOD WITH A PLURALITY OF LEDS, AND ITS APPLICATION IN IMAGING SYSTEM

(75) Inventor: Chunrong Li, Guangdong (CN)

(73) Assignee: GUANGZHOU YAJIANG PHOTOELECTRIC EQUIPMENT CO., LTD, Guangzhou, Guangdong (CN)

( * ) Notice: Subject to any disclaimer, the term of this patent is extended or adjusted under 35 U.S.C. 154(b) by 525 days.

(21) Appl. No.: 13/981,075

(22) PCT Filed: Nov. 18, 2011

(86) PCT No.: PCT/CN2011/082394
§ 371 (c)(1),
(2), (4) Date: Jul. 22, 2013

(87) PCT Pub. No.: WO2012/100584
PCT Pub. Date: Aug. 2, 2012

(65) Prior Publication Data
US 2013/0301265 A1 Nov. 14, 2013

(30) Foreign Application Priority Data

Jan. 24, 2011 (CN) .............................. 201110024386
Jan. 24, 2011 (CN) .............................. 201120020562
Jan. 24, 2011 (CN) .............................. 201120020563
Jan. 24, 2011 (CN) .............................. 201120020565

(51) Int. Cl.
*F21V 5/00* (2015.01)
*G02B 19/00* (2006.01)
(Continued)

(52) U.S. Cl.
CPC ............. *F21V 5/007* (2013.01); *G02B 3/0056* (2013.01); *G02B 19/0014* (2013.01); *G02B 19/0066* (2013.01); *G02B 27/0961* (2013.01)

(58) Field of Classification Search
CPC ........ F21V 5/007; F21V 13/08; F21V 23/02; F21V 5/04; G02B 3/0056; G02B 27/0961; G02B 19/0066; G02B 19/0014; G02B 26/008; G02B 19/0038; G02B 21/0092; G02B 23/2484; G02B 26/0833; G02B 26/12; G02B 27/1013; G02B 27/123; G02B 27/141; G02B 27/2264; G02B 5/3083; G02B 6/0023; G02B 6/0031; G02B 6/0046; G02B 6/005; G02B 6/0053; G02B 6/0073; G02B 6/29311; G02B 6/3512; G02B 6/3556; G02B 6/356; G02B 6/4214; G02B 6/4231; G02B 6/4246; G03B 21/204; G03B 21/008; G03B 21/16; G03B 21/2013; G03B 21/2053; G03B 21/2066; G03B 21/2073; G03B 21/208; G03B 33/04; G03B 33/08; G03B 33/12; F21S 48/00; F21S 48/115; F21S 48/1154; F21Y 2101/02; H02S 40/22
See application file for complete search history.

(56) References Cited

U.S. PATENT DOCUMENTS

2002/0171944 A1* 11/2002 Suenaga ............. G03F 7/70058
359/689

FOREIGN PATENT DOCUMENTS

CN 1148180 A 4/1997
CN 1213085 A 4/1999
(Continued)

*Primary Examiner* — Stephen F Husar
*Assistant Examiner* — Danielle Allen
(74) *Attorney, Agent, or Firm* — Tim Tingkang Xia, Esq.; Locke Lord LLP

(57) ABSTRACT

A condensing system and method with a plurality of LEDs is disclosed. The LEDs are positioned on the same plane. A first condensing lens is disposed at front of each LED, a second condensing lens is disposed at front of each first condensing lens, a third condensing lens is disposed at front of each second condensing lens, and a fourth condensing lens is disposed at front of all the third condensing lenses. After the light emitted by each LED is condensed by the corresponding first condensing lens, second condensing lens and third condensing lens, the divergence angle of the light becomes smaller, forming a bunch of nearly parallel light beams. The bunches of nearly parallel light beams simultaneously transmit through the fourth condensing lens, and then combine. The condensing system can be used as the light source with imaging lenses disposed therebehind to form an imaging system.

28 Claims, 6 Drawing Sheets

(51) Int. Cl.
*G02B 27/09* (2006.01)
*G02B 3/00* (2006.01)

(56) References Cited

FOREIGN PATENT DOCUMENTS

| CN | 2585257 Y | 11/2003 |
|----|-----------|---------|
| CN | 2586179 Y | 11/2003 |
| CN | 201636759 U | 11/2010 |
| CN | 101950083 A | 1/2011 |
| CN | 102121662 A | 7/2011 |
| CN | 201935002 U | 8/2011 |
| CN | 201935116 U | 8/2011 |
| CN | 201983022 U | 9/2011 |
| JP | 2006-058488 A | 3/2006 |
| TW | I286612 B | 9/2007 |

* cited by examiner

LED CONDENSING SYSTEM AND METHOD WITH A PLURALITY OF LEDS, AND ITS APPLICATION IN IMAGING SYSTEM

FIELD OF THE INVENTION

The invention relates to light condensing and imaging of LED, particularly to light condensing and imaging of flat multiple LEDs.

BACKGROUND OF THE INVENTION

Focusing of light mainly needs two parts, the first is light source, and the second is focusing device. The existing light condensing method of multiple LEDs usually achieves aim by changing the angle of light of each LED lamp bead of LED light source. For example, a LED focusing device, whose Chinese patent publication number is 201575340U, includes base and more than two LED lights; the LED light includes LED light source, equipped lens, lens holder and heat dissipating column, the LED light source is installed at one end of the heat dissipating column, the equipped lens is installed on the front of the LED light source and enwraps the LED light source, and the equipped lens is installed on the heat dissipating column by the lens holder; the LED light is installed on the base by the heat dissipating column, the base is an arcuate curved sheet, and the LED light is installed on the arcuate curved sheet. In the above-mentioned imaging device, the LED light source is installed on the arcuate curved sheet, and collects the light emitted by the LED light depending on the angle of the arcuate curved sheet, and thus achieves the effect of light condensing. This kind of imaging device has the following defects: the arcuate curved sheet as part of the light source is hard to process, and its schedule requirements are high; the installation accuracy requirements are high; once the arc of the curved sheet is processed to be a mold, the position of the LED light source cannot be changed, and cannot be focused by the light source, only can be focused by lens group, the workload of collating the multiple lens in the imaging lens group is heavy, and is time-consuming; and the shot group used by the method of light condensing is big, the distance of light condensing is long, the light condensing is not uneven, resulting in high cost.

SUMMARY OF THE INVENTION

One of the technical problems to be solved by the present invention is to provide a multiple LED condensing system used in lamps with the capability of imaging, where processing and installation of the surface light source is easy with a low cost, and is easy to focus or to achieve short-distance light condensing, with uniformly condensed light suitable for imaging.

The second technical problem to be solved by the present invention is to provide a multiple LED condensing method used in lamps with the capability of imaging, where processing and installation of the surface light source is easy with a low cost, and is easy to focus or to achieve short-distance light condensing, with uniformly condensed light suitable for imaging.

The third technical problem to be solved by the present invention is to provide a multiple LED condensing and imaging system with function of focusing, where processing and installation of the surface light source is easy with a low cost, and is easy to focus or to achieve short-distance light condensing.

The fourth technical problem to be solved by the present invention is to provide a multiple LED condensing and imaging system with function of zooming, where processing and installation of the surface light source is easy with a low cost, and is easy to focus or to achieve short-distance light condensing.

To solve the above-mentioned first technical problem, one aspect of the present invention relates to a multiple LED condensing system, including a light source, including a flat substrate and a plurality of LEDs disposed on the flat substrate; a plurality of first condensing lenses, wherein each first condensing lens disposed at front of each LED, wherein all of the first condensing lenses form a first condensing lens group; a plurality of second condensing lenses, wherein each second condensing lens is disposed at front of each first condensing lens, wherein all of the second condensing lenses form a second condensing lens group; a plurality of third condensing lenses, wherein each third condensing lens is disposed at front of each second condensing lens, wherein all of the third condensing lenses form a third condensing lens group; and a fourth condensing lens disposed at front of the third condensing lens group. The system can achieve condensing 80% light flux of divergent light of single LED light bead into a nearly parallel light beam with small divergence by lens groups with small diameters, and then condensing multiple nearly parallel light beams to a position near the focus point of the fourth condensing lens by the fourth condensing lens to implement condensing of light beams of multiple light beads. The LED light beads are on the same plane, which is easy to install, process and dissipate heat with a low cost; optical efficiency can be enhanced by 80%; short-distance light condensing can be achieved with uniformly condensed light.

In one embodiment, each of the first condensing lenses is an aspherical lens, having a conical coefficient of −0.85 to −0.6, a curvature radius of 4.5 to 10 mm, and a diameter of 10 to 20 mm.

In one embodiment, each of the second condensing lenses is an ordinary spherical lens having a left convex curvature radius of 20~60 mm, a right convex curvature radius of 8~20 mm, and a diameter of 10~20 mm.

In one embodiment, each of the third condensing lenses is a simple plano-convex lens having a convex curvature radius of 40~80 mm, and a diameter of 20~30 mm.

In one embodiment, the fourth condensing lens has a focal length of 80~120 mm, and a diameter of 65~75 mm.

In one embodiment, a distance between the first condensing lens and the second condensing lens is 0~3 mm.

In one embodiment, a distance between the second condensing lens and the third condensing lens is 8~15 mm.

In one embodiment, a distance between the third condensing lens and the fourth condensing lens is 2~50 mm.

In one embodiment, an edge thickness of each of the first, second, third, and fourth condensing lenses is 1~5 mm.

To solve the above-mentioned second technical problem, one aspect of the present invention relates to a multiple LED condensing method, including: disposing a plurality of LEDs on a same plane; disposing a plurality of first condensing lenses respectively at front of each LED, wherein all of the first condensing lenses form a first condensing lens group; disposing a plurality of second condensing lenses respectively at front of each first condensing lens, wherein all of the second condensing lenses form a second condensing lens group; disposing a plurality of third condensing lenses respectively at front of each second condensing lens, wherein all of the third condensing lenses form a third condensing lens group; and disposing a fourth condensing lens at front of the third condensing lens group. Light emitted by each LED is condensed by the corresponding first, second and third condensing lenses, and the divergence angle of the light becomes smaller, forming a bunch of nearly parallel light beams, and the bunches of nearly parallel light beams simultaneously transmit through the fourth condensing lens and combine such that more than 60% of light is condensed within a diameter range of 20 mm~60 mm near a focus point of the fourth condensing lens, and more than 60% of the divergence angle of the light is under 40 degree. The method can achieve condensing 80% light flux of divergent light of single LED light bead into a nearly parallel light beam with small divergence by lens groups with small diameters, and then condensing multiple nearly parallel light beams to a position near the focus point of the fourth condensing lens by the fourth condensing lens to implement condensing of light beams of multiple light beads. The LED light beads are on the same plane, which is easy to install, process and dissipate heat with a low cost; optical efficiency can be enhanced by 80%; short-distance light condensing can be achieved with uniformly condensed light.

In one embodiment, all of the LEDs are disposed on a flat substrate, the flat substrate is easy to process with a low cost; the installation accuracy requirement on the plane of the LED is relatively low.

In one embodiment, each of the first condensing lenses is an aspherical lens, wherein all of the first condensing lenses are on a first plane, and the first condensing lens group conducts a first condensing of the light emitted by the LEDs.

In one embodiment, each of the second condensing lenses is a spherical lens, wherein all of the second condensing lenses are on a second plane, and the second condensing lens group conducts a second condensing of the light emitted by the LEDs.

In one embodiment, each of the third condensing lenses is an spherical lens, wherein all of the third condensing lenses are on a third plane, and the third condensing lens group conducts a third condensing of the light emitted by the LEDs.

In one embodiment, the fourth condensing lens is a positive lens, where non-Snell lens or ordinary spherical condensing lens can be used, the focal length of the fourth condensing lens is 80~120 mm, with a diameter of 65~75 mm, and an edge thickness of 1~5 mm. The fourth condensing lens converges the bunches of nearly parallel light beams being condensed for three times to the focus point of the fourth condensing lens. The distance of between the first condensing lens and the second condensing lens is 0~3 mm, the distance between the second condensing lens and the third condensing lens is 8~15 mm, and the distance between the third condensing lens and the fourth condensing lens.

To solve the above-mentioned third technical problem, one aspect of the present invention relates to a multiple LED condensing system with function of focusing, including a light source, and an imaging lens group disposed at front of light source. The light source includes a flat substrate; a plurality of LEDs disposed on the flat substrate; a plurality of first condensing lenses, wherein each first condensing lens disposed at front of each LED, wherein all of the first condensing lenses form a first condensing lens group; a plurality of second condensing lenses, wherein each second condensing lens is disposed at front of each first condensing lens, wherein all of the second condensing lenses form a second condensing lens group; a plurality of third condensing lenses, wherein each third condensing lens is disposed at front of each second condensing lens, wherein all of the third condensing lenses form a third condensing lens group; and a fourth condensing lens disposed at front of the third condensing lens group. The imaging lens group includes, along a direction of optical path, a first plano-convex lens, a second plano-convex lens and a third plano-convex lens. The light source of the imaging system can achieve condensing 80% light flux of divergent light of single LED light bead into a nearly parallel light beam with small divergence by lens groups with small diameters, and then condensing multiple nearly parallel light beams to a position near the focus point of the fourth condensing lens by the fourth condensing lens to implement condensing of light beams of multiple light beads. The LED light beads are on the same plane, which is easy to install, process and dissipate heat with a low cost; optical efficiency can be enhanced by 80%; short-distance light condensing can be achieved with uniformly condensed light. As for the imaging lens group of the imaging system, the structure of the lens groups of the whole imaging system is simple with a low cost and clear imaging, and has a long range of the imaged object, which can reach 60 mm, with multiple imaged objects. The imaging system formed by the light source and imaging lens group has a high efficiency of focusing, and has a low cost using high-power LEDs as the light source.

In one embodiment, each of the first condensing lenses is an aspherical lens having a conical coefficient of −0.85 to −0.6, a curvature radius of 4.5 to 10 mm, and a diameter of 10 to 20 mm; each of the second condensing lenses is an ordinary spherical lens having a left convex curvature radius of 20~60 mm, a right convex curvature radius of 8~20 mm, and a diameter of 10~20 mm; each of the third condensing lenses is a simple plano-convex lens having a convex curvature radius of 40~80 mm, and a diameter of 20~30 mm; and the fourth condensing lens has a focal length of 80~120 mm, and a diameter of 65~75 mm.

In one embodiment, a distance between the first condensing lens and the second condensing lens is 0~3 mm; a distance between the second condensing lens and the third condensing lens is 8~15 mm; and a distance between the third condensing lens and the fourth condensing lens is 2~50 mm.

In one embodiment, the first plano-convex lens has a right convex curvature radius of 70~85 mm, and a diameter of 63~74 mm; the second plano-convex lens has a right convex curvature radius of 120~140 mm, and a diameter of 65~75 mm; the third plano-convex lens has a right convex curvature radius of 140~160 mm, and a diameter of 75~85 mm.

In one embodiment, a distance between the first plano-convex lens and the second plano-convex lens is 0~3 mm; the first plano-convex lens and the second plano-convex lens form a focusing lens group, and the focusing lens group is 25~60 mm behind the imaged object in the system; and the third plano-convex lens is 150~170 mm behind the imaged object in the system.

In one embodiment, an edge thickness of each of the first condensing lenses, the second condensing lenses, the third condensing lenses, the fourth condensing lens, the first plano-convex lens, the second plano-convex lens, and the third plano-convex lens are 1~5 mm.

To solve the above-mentioned fourth technical problem, one aspect of the present invention relates to a multiple LED condensing system with function of zooming, including a light source, and an imaging lens group disposed at front of the light source.
The light source includes
a flat substrate; a plurality of LEDs disposed on the flat substrate; a plurality of first condensing lenses, wherein each first condensing lens disposed at front of each LED, wherein all of the first condensing lenses form a first condensing lens group; a plurality of second condensing lenses, wherein each second condensing lens is disposed at front of each first condensing lens, wherein all of the second condensing lenses form a second condensing lens group; a plurality of third condensing lenses, wherein each third condensing lens is disposed at front of each second condensing lens, wherein all of the third condensing lenses form a third condensing lens group; and a fourth condensing lens disposed at front of the third condensing lens group. The imaging lens group includes, along a direction of optical path, a first plano-convex lens, a glued lens, a double convex lens, a double concave lens, and a second plano-convex lens. The light source of the imaging system can achieve condensing 80% light flux of divergent light of single LED light bead into a nearly parallel light beam with small divergence by lens groups with small diameters, and then condensing multiple nearly parallel light beams to a position near the focus point of the fourth condensing lens by the fourth condensing lens to implement condensing of light beams of multiple light beads. The LED light beads are on the same plane, which is easy to install, process and dissipate heat with a low cost; optical efficiency can be enhanced by 80%; short-distance light condensing can be achieved with uniformly condensed light. As for the imaging lens group of the imaging system, the structure of the lens groups of the whole imaging system is simple with a low cost and clear imaging, and has a long range of the imaged object, which can reach 70 mm, with multiple imaged objects. The imaging system formed by the light source and imaging lens group has the function of long range zooming, which can form the image of the imaged object at any distance outside 1 m behind the lens with a low cost and high efficiency of zooming and focusing, and has a low cost using high-power LEDs as the light source.

In one embodiment, each of the first condensing lensesis an aspherical lens, having a conical coefficient of −0.85~−0.6, a curvature radius of 4.5~10 mm, and a diameter of 10~20 mm; each of the second condensing lenses is an ordinary spherical lens, having a left convex curvature radius of 20~60 mm, a right convex curvature radius of 8~20 mm, and a diameter of 10~20 mm; each of the third condensing lenses is a simple plano-convex lens, having a convex curvature radius of 40 to 80 mm, and a diameter of 20 to 30 mm; and the fourth condensing lens has a focal length of 80~120 mm, and a diameter of 65~75 mm.

In one embodiment, a distance between the first condensing lens and the second condensing lens is 0~3 mm; a distance between the second condensing lens and the third condensing lens is 8~15 mm; and a distance between the third condensing lens and the fourth condensing lens is 2~50 mm.

In one embodiment, the first plano-convex lens has a right convex curvature radius of 60~70 mm, and a diameter of 65~75 mm; the glued lens has a left convex curvature radius of 400~420 mm, a middle convex curvature radius of 57~60 mm, a right convex curvature radius of 200~240 mm, and a diameter of 65~75 mm; the double convex lens has a left convex curvature radius of 85~95 mm, a right convex curvature radius of 550~580 mm, and a diameter of 65~75 mm; the double concave lens has a left concave curvature radius of 110~130 mm, a right convex curvature radius of 300~330 mm, a diameter of 65~75 mm, and a center thickness of 2~5 mm; the second plano-convex lens has a right convex curvature radius of 100~130 mm, and a diameter of 115~125 mm.

In one embodiment, a distance between the first plano-convex lens and the glued lens is 0~3 mm; the first plano-convex lens, the glued lens, and the double convex lens form a focusing lens group, the focusing lens group is 30~100 mm behind the imaged object, the double concave lens is 120~190 mm behind the imaged object, and the second plano-convex lens is 210~230 mm behind the imaged object.

In one embodiment, an edge thickness of each of the first condensing lenses, the second condensing lenses, the third condensing lenses, the fourth condensing lens, the first plano-convex lens, the double convex lens, and the second plano-convex lens is 1~5 mm.

In one embodiment, the LEDs are uniformly distributed, forming multi-point plane light source.

The advantageous effects produced by the present invention compared with the prior art are as follows:

1. The flat LED light group is easier to process, and the processing and installation accuracy requirements are not high;

2. Focusing can be achieved through the fourth condensing lens, and focusing is quicker and easier.

3. The heat dissipation of the flat LED light source is easy to conduct, and cost less;

4. The light source is condensed four times; the optical efficiency is improved by 80%;

5. Light condensing is achieved within a short distance, and the light is uniformly condensed.

6. The first plano-convex lens and the second plano-convex lens form a focusing lens group, using for focusing of system in the imaging system, making the image outside 2 meters behind the shot clear;

7. The structure of the shot of the whole imaging system is simple, costs less, having a clear image, with long range of imaged object, which can reach 60 mm, and can deposit many imaged object.

8. The range of the imaged object of the system is big, can reach 70 mm, and can deposit many imaged object;

9. The system has function of zooming within a long range, and makes the image of the imaged object at any distance outside 1 meter behind the shot, with low cost.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The following figures are presented for the purpose of illustration only, and are not intended to be limiting.

DETAILED DESCRIPTION OF THE INVENTION

Figure 1:
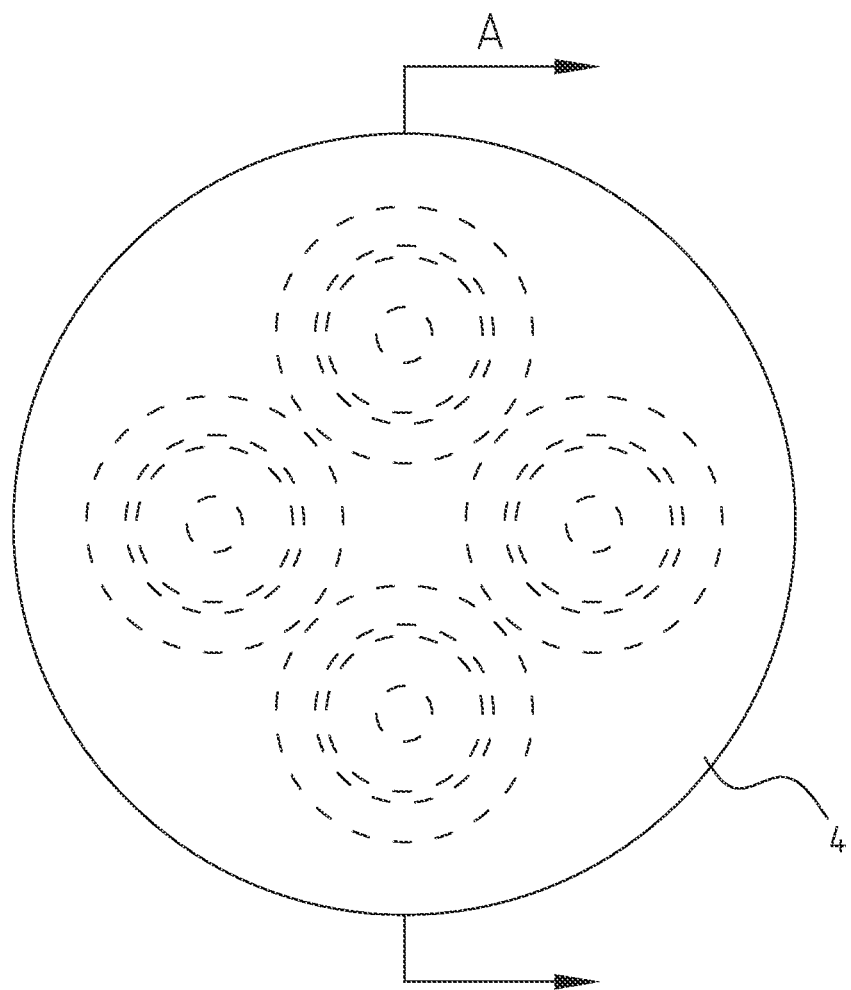
FIG. 1 is a top view of the condensing system of embodiments 1 to 6 of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention.

Further illustration on the present invention will be given in the following in conjunction with drawings.

Embodiment 1

Figure 2:
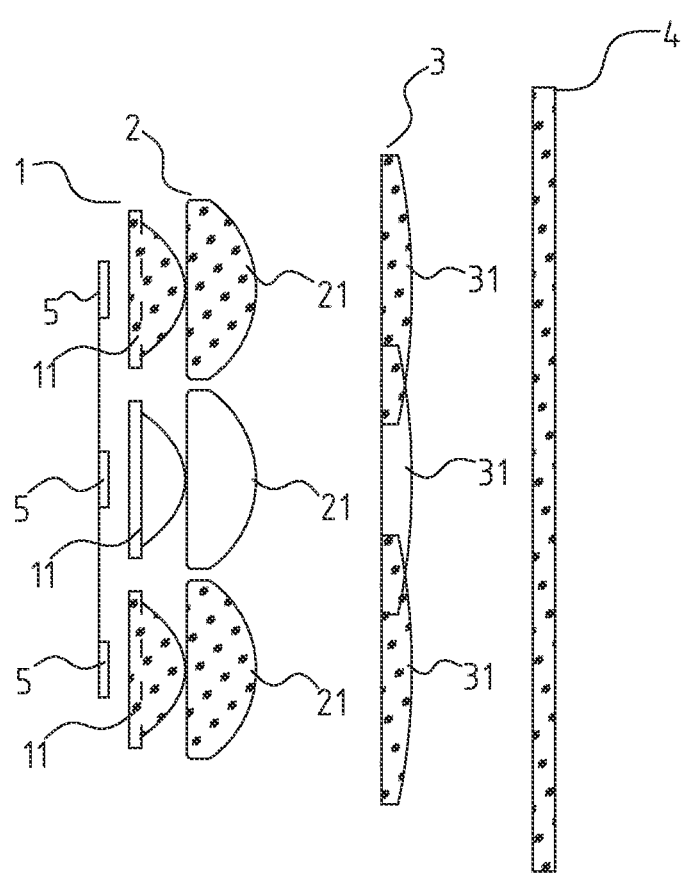
FIG. 2 is a cross-sectional view along A-A line of FIG. 1.
Figure 3:
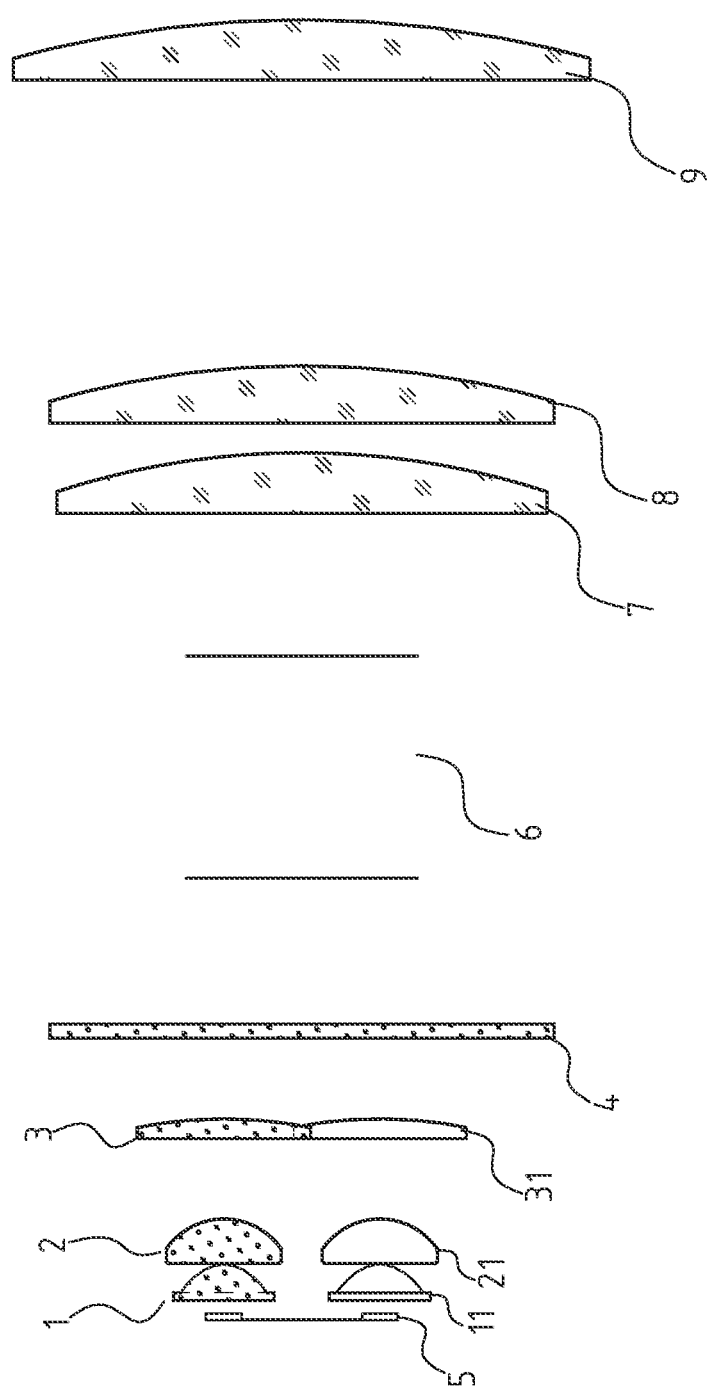
FIG. 3 is a structure diagram of the imaging system of embodiments 7 to 9.
Figure 4:
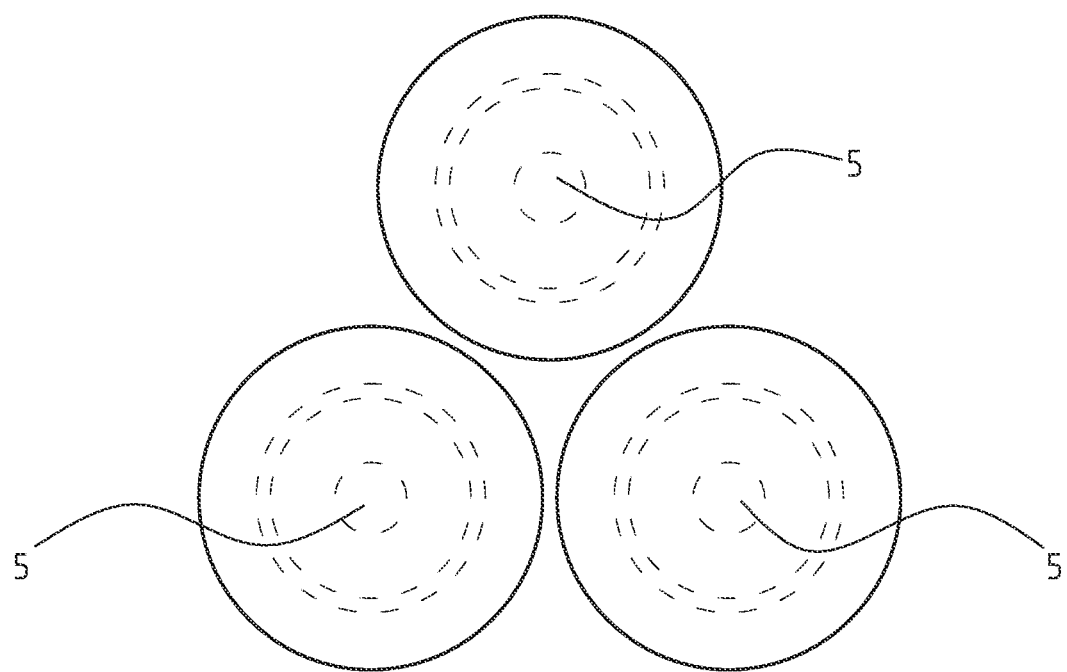
FIG. 4 is a dissembled view of the light beads of the light source of imaging system of embodiments 7 to 9.
Figure 5:
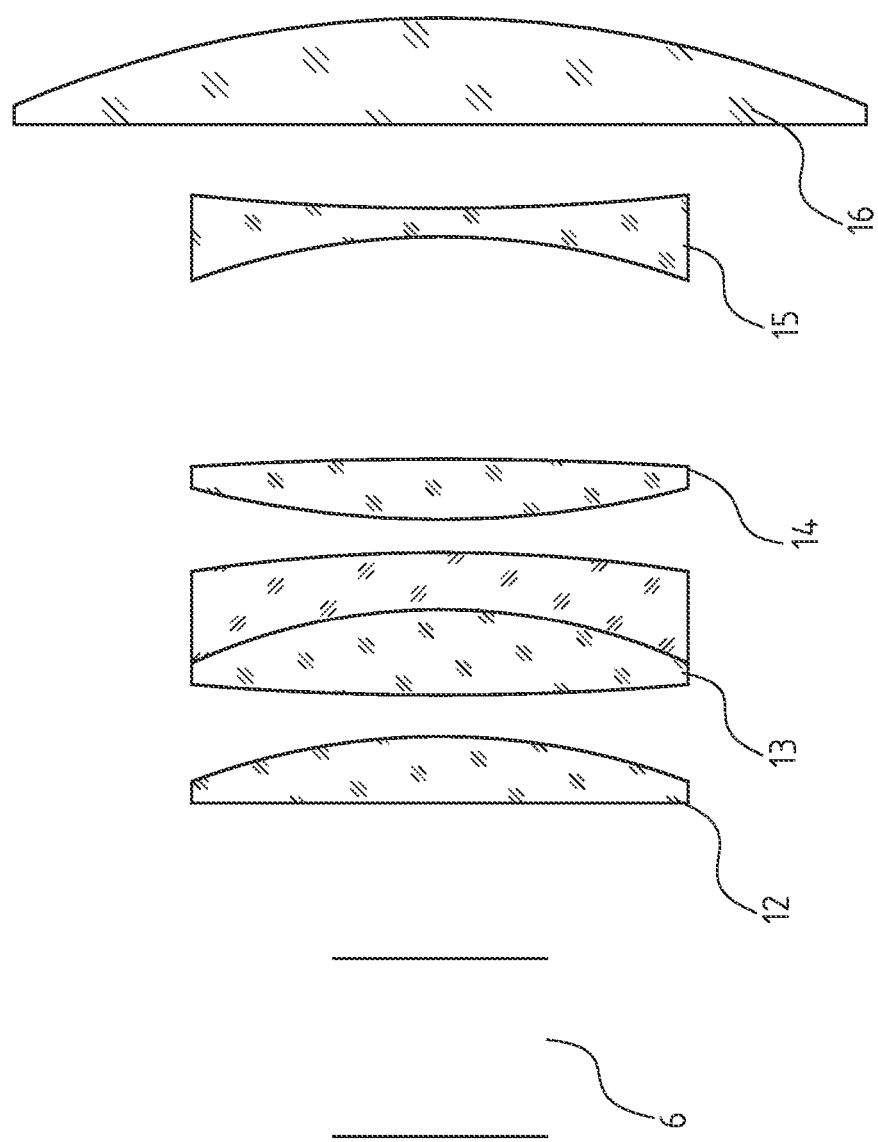
FIG. 5 is a structure diagram of the imaging system of embodiments 10 to 12.
Figure 5:
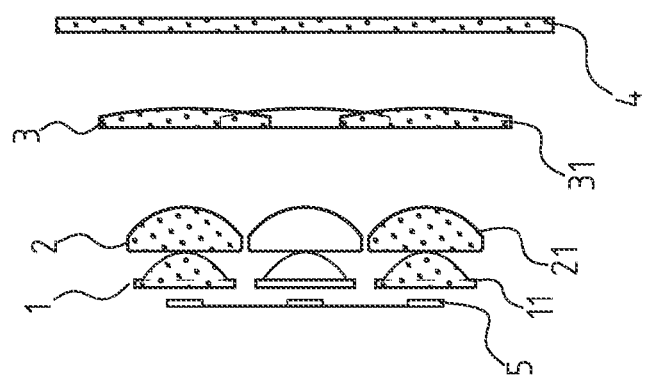
Figure 6:
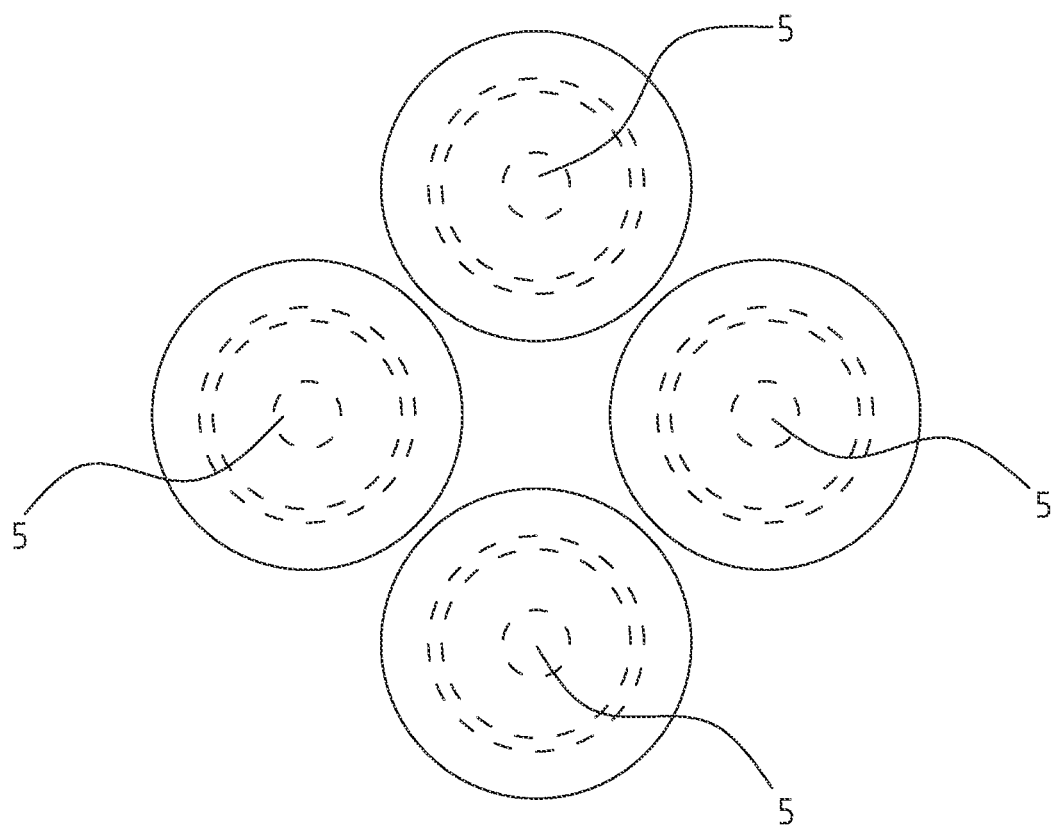
FIG. 6 is a dissembled view of the light beads of the light source of imaging system of embodiments 10 to 12.

As shown in FIG. 1 and FIG. 2, a multiple LED condensing system using for lamp is capable of imaging, the multiple LED condensing system includes a flat light source, the flat light source includes a flat substrate, and multiple LEDs 5 are distributed uniformly on the flat substrate. There are four LEDs 5 in the present embodiment. The four LEDs 5 are on the same plane to form the flat light source. A first condensing lens 11 is disposed at front of each LED 5, the first condensing lens 11 is an aspherical lens, the conical coefficient is −0.85, the curvature radius is 4.5 mm, the diameter is 10 mm, the edge thickness is 1 mm, the four first condensing lenses 11 are on the same plane to form a first condensing lens group 1, conducting the first condensing on light emitted by the LEDs. A second condensing lens 21 is disposed at front of each first condensing lens 11, the second condensing lens 21 is an ordinary spherical lens, its left curvature radius is 20 mm, right curvature radius is 8 mm, diameter is 10 mm, and edge thickness is 1 mm, and the four second condensing lenses 21 are on the same plane to form a second condensing lens group 2, conducting the second condensing on the light emitted by the LEDs. A third condensing lens 31 is disposed at front of each second condensing lens 21 correspondingly, the third condensing lens 31 is a simple plano-convex lens, its curvature radius of convex is 40 mm, the diameter is 20 mm, and the edge thickness is 1 mm, and the four third condensing lenses 31 are on the same plane to form a third condensing lens group 3, conducting the third condensing on the light emitted by the LEDs. A fourth condensing lens 4 is disposed at front of the third condensing lens group 3, the fourth condensing lens 4 is a non-Snell lens, the focal distance of the fourth condensing lens is 80 mm, the diameter is 65 mm, and the edge thickness is 1 mm. The first condensing lens 11, the second condensing lens 21 and the third condensing lens 31 form the condensing system, the distance between the first condensing lens and the second colleting lens is 0 mm, the distance between the second condensing lens and the third condensing lens is 8 mm, and the distance between the third condensing lens and the fourth condensing lens is 2 mm, it can be conducted that condensing the 80% light flux of divergent light of single light bead into nearly parallel light with small divergence by shot combination with small diameter, and then condensing multiple nearly parallel light to the position near the focus point of the fourth condensing lens 4 by the fourth condensing lens 4, and achieving the combination of the beams of multiple light beads.

Embodiment 2

As shown in FIG. 1 and FIG. 2, a multiple LED condensing system using for lamp is capable of imaging, the multiple LED condensing system includes a flat light source, the flat light source includes a flat substrate, and multiple LEDs 5 are distributed uniformly on the flat substrate. There are four LEDs 5 in the present embodiment. The four LEDs 5 are on the same plane to form the flat light source. A first condensing lens 11 is disposed at front of each LED 5, the first condensing lens 11 is an aspherical lens, the conical coefficient is −0.7, the curvature radius is 7.0 mm, the diameter is 15 mm, the edge thickness is 3 mm, the four first condensing lenses 11 are on the same plane to form a first condensing lens group 1, conducting the first condensing on light emitted by LED. A second condensing lens 21 is disposed at front of each first condensing lens 11, the second condensing lens 21 is an ordinary spherical lens, its left curvature radius is 40 mm, right curvature radius is 14 mm, diameter is 15 mm, and edge thickness is 3 mm, and the four second condensing lenses 21 are on the same plane to form a second condensing lens group 2, conducting the second condensing on the light emitted by LED. A third condensing lens 31 is disposed at front of each second condensing lens 21 correspondingly, the third condensing lens 31 is a simple plano-convex lens, its curvature radius of convex is 60 mm, the diameter is 25 mm, and the edge thickness is 3 mm, and the four third condensing lenses 31 are on the same plane to form a third condensing lens group 3, conducting the third condensing on the light emitted by LED. A fourth condensing lens 4 is disposed at front of the third condensing lens group 3, the fourth condensing lens 4 is a non-Snell lens, the focal distance of the fourth condensing lens is 100 mm, the diameter is 70 mm, and the edge thickness is 3 mm. The first condensing lens 11, the second condensing lens 21 and the third condensing lens 31 form the condensing system, the distance between the first condensing lens and the second colleting lens is 1.5 mm, the distance between the second condensing lens and the third condensing lens is 12 mm, and the distance between the third condensing lens and the fourth condensing lens is 25 mm, it can be conducted that condensing the 80% light flux of divergent light of single light bead into nearly parallel light with small divergence by shot combination with small diameter, and then condensing multiple nearly parallel light to the position near the focus point of the fourth condensing lens 4 by the fourth condensing lens 4, and achieving the combination of the beams of multiple light beads.

Embodiment 3

As shown in FIG. 1 and FIG. 2, a multiple LED condensing system using for lamp is capable of imaging, the multiple LED condensing system includes a flat light source, the flat light source includes a flat substrate, and multiple LEDs 5 are distributed uniformly on the flat substrate. There are four LEDs 5 in the present embodiment. The four LEDs 5 are on the same plane to form the flat light source. A first condensing lens 11 is disposed at front of each LED 5, the first condensing lens 11 is an aspherical lens, the conical coefficient is −0.6, the curvature radius is 10 mm, the diameter is 20 mm, the edge thickness is 5 mm, the four first condensing lenses 11 are on the same plane to form a first condensing lens group 1, conducting the first condensing on light emitted by LED. A second condensing lens 21 is disposed at front of each first condensing lens 11, the second condensing lens 21 is an ordinary spherical lens, its left curvature radius is 60 mm, right curvature radius is 20 mm, diameter is 20 mm, and edge thickness is 5 mm, and the four second condensing lenses 21 are on the same plane to form a second condensing lens group 2, conducting the second condensing on the light emitted by LED. A third condensing lens 31 is disposed at front of each second condensing lens 21 correspondingly, the third condensing lens 31 is a simple plano-convex lens, its curvature radius of convex is 80 mm, the diameter is 30 mm, and the edge thickness is 5 mm, and the four third condensing lenses 31 are on the same plane to form a third condensing lens group 3, conducting the third condensing on the light emitted by LED. A fourth condensing lens 4 is disposed at front of the third condensing lens group 3, the fourth condensing lens 4 is a non-Snell lens, the focal distance of the fourth condensing lens is 120 mm, the diameter is 75 mm, and the edge thickness is 5 mm. The first condensing lens 11, the second condensing lens 21 and the third condensing lens 31 form the condensing system, the distance between the first condensing lens and the second colleting lens is 3 mm, the distance between the second condensing lens and the third condensing lens is 15 mm, and the distance between the third condensing lens and the fourth condensing lens is 50 mm, it can be conducted that condensing the 80% light flux of divergent light of single light bead into nearly parallel light with small divergence by shot combination with small diameter, and then condensing multiple nearly parallel light to the position near the focus point of the fourth condensing lens 4 by the fourth condensing lens 4, and achieving the combination of the beams of multiple light beads.

It can be seen from the above embodiments 1~3 that, the flat LED light source is easy to process, the processing and installation accuracy requirements are not high; focusing can be done through the fourth condensing lens 4, and it is quicker and easier to focus; the heat dissipation of the flat LED light source is easy to conduct, with low cost; the optical efficiency is improved by 80%; light combining can be achieved within short distance, and the combined light is even. Three times of condensing are conducted uniformly and descendingly, the beam angle of 120 degree emitted by the LEDs is collected to 70-80 degree through the first condensing lens group 1 on the first time, collected to 30-40 degree through the second condensing lens group 2 on the second time, collected to within 20 degree through the third condensing lens group 3 on the third time, and collected near the focus point of the fourth condensing lens 4 at last, more than 60% of light are concentrated within the diameter range of 20 mm-60 mm, and more than 60% divergence angles of light are within 40 degree, suitable for depositing imaged object.

Embodiment 4

As shown in FIG. 1 and FIG. 2, a multiple LED condensing method using for lamp is capable of imaging, the light condensing are conducted by the flat light source, the flat light source includes a flat substrate, and multiple LEDs 5 are distributed uniformly on the flat substrate. There are four LEDs 5 in the present embodiment. The four LEDs 5 are on the same plane to form the flat light source. A first condensing lens 11 is disposed at front of each LED 5, the first condensing lens 11 is aspherical lens, the conical coefficient is −0.85, the curvature radius is 4.5 mm, the diameter is 10 mm, the edge thickness is 1 mm, the four first condensing lenses 11 are on the same plane and form a first condensing lens group 1, conducting the first condensing on light emitted by LED. A second condensing lens 21 is disposed at front of each first condensing lens 11, the second condensing lens 21 is an ordinary spherical lens, its left curvature radius is 20 mm, right curvature radius is 8 mm, diameter is 10 mm, and edge thickness is 1 mm, and the four second condensing lenses 21 are on the same plane and form a second condensing lens group 2, conducting the second condensing on the light emitted by LED. A third condensing lens 31 is disposed at front of each second condensing lens 21 correspondingly, the third condensing lens 31 is a simple plano-convex lens, its curvature radius of convex is 40 mm, the diameter is 20 mm, and the edge thickness is 1 mm, and the four third condensing lenses 31 are on the same plane and form a third condensing lens group 3, conducting the third condensing on the light emitted by LED. A fourth condensing lens 4 is disposed at front of the third condensing lens group 3, the fourth condensing lens 4 is a non-Snell lens, the focal distance of the fourth condensing lens is 80 mm, the diameter is 65 mm, and the edge thickness is 1 mm. The first condensing lens 11, the second condensing lens 21 and the third condensing lens 31 form the condensing system, the distance between the first condensing lens and the second colleting lens is 0 mm, the distance between the second condensing lens and the third condensing lens is 8 mm, and the distance between the third condensing lens and the fourth condensing lens is 2 mm, it can be conducted that condensing the 80% light flux of divergent light of single light bead into nearly parallel light with small divergence by shot combination with small diameter, and then condensing multiple nearly parallel light to the position near the focus point of the fourth condensing lens 4 by the fourth condensing lens 4, and achieving the combination of the beams of multiple light beads.

Embodiment 5

As shown in FIG. 1 and FIG. 2, a multiple LED condensing method using for lamp is capable of imaging, the light condensing are conducted by the flat light source, the flat light source includes a flat substrate, and multiple LEDs 5 are distributed uniformly on the flat substrate. There are four LEDs 5 in the present embodiment. The four LEDs 5 are on the same plane to form the flat light source. A first condensing lens 11 is disposed at front of each LED 5, the first condensing lens 11 is an aspherical lens, the conical coefficient is −0.7, the curvature radius is 7.0 mm, the diameter is 15 mm, the edge thickness is 3 mm, the four first condensing lenses 11 are on the same plane and form a first condensing lens group 1, conducting the first condensing on light emitted by LED. A second condensing lens 21 is disposed at front of each first condensing lens 11, the second condensing lens 21 is an ordinary spherical lens, its left curvature radius is 40 mm, right curvature radius is 14 mm, diameter is 15 mm, and edge thickness is 3 mm, and the four second condensing lenses 21 are on the same plane and form a second condensing lens group 2, conducting the second condensing on the light emitted by LED. A third condensing lens 31 is disposed at front of each second condensing lens 21 correspondingly, the third condensing lens 31 is a simple plano-convex lens, its curvature radius of convex is 60 mm, the diameter is 25 mm, and the edge thickness is 3 mm, and the four third condensing lenses 31 are on the same plane and form a third condensing lens group 3, conducting the third condensing on the light emitted by LED. A fourth condensing lens 4 is disposed at front of the third condensing lens group 3, the fourth condensing lens 4 is a non-Snell lens, the focal distance of the fourth condensing lens is 100 mm, the diameter is 70 mm, and the edge thickness is 3 mm. The first condensing lens 11, the second condensing lens 21 and the third condensing lens 31 form the condensing system, the distance between the first condensing lens and the second colleting lens is 1.5 mm, the distance between the second condensing lens and the third condensing lens is 12 mm, and the distance between the third condensing lens and the fourth condensing lens is 25 mm, it can be conducted that condensing the 80% light flux of divergent light of single light bead into nearly parallel light with small divergence by shot combination with small diameter, and then condensing multiple nearly parallel light to the position near the focus point of the fourth condensing lens 4 by the fourth condensing lens 4, and achieving the combination of the beams of multiple light beads.

Embodiment 6

As shown in FIG. 1 and FIG. 2, a multiple LED condensing method using for lamp is capable of imaging, the light condensing are conducted by the flat light source, the flat light source includes a flat substrate, and multiple LEDs 5 are distributed uniformly on the flat substrate. There are four LEDs 5 in the present embodiment. The four LEDs 5 are on the same plane to form the flat light source. A first condensing lens 11 is disposed at front of each LED 5, the first condensing lens 11 is aspherical lens, the conical coefficient is −0.6, the curvature radius is 10 mm, the diameter is 20 mm, the edge thickness is 5 mm, the four first condensing lenses 11 are on the same plane and form a first condensing lens group 1, conducting the first condensing on light emitted by LED. A second condensing lens 21 is disposed at front of each first condensing lens 11, the second condensing lens 21 is an ordinary spherical lens, its left curvature radius is 60 mm, right curvature radius is 20 mm, diameter is 20 mm, and edge thickness is 5 mm, and the four second condensing lenses 21 are on the same plane and form a second condensing lens group 2, conducting the second condensing on the light emitted by LED. A third condensing lens 31 is disposed at front of each second condensing lens 21 correspondingly, the third condensing lens 31 is a simple plano-convex lens, its curvature radius of convex is 80 mm, the diameter is 30 mm, and the edge thickness is 5 mm, and the four third condensing lenses 31 are on the same plane and form a third condensing lens group 3, conducting the third condensing on the light emitted by LED. A fourth condensing lens 4 is disposed at front of the third condensing lens group 3, the fourth condensing lens 4 is a non-Snell lens, the focal distance of the fourth condensing lens is 120 mm, the diameter is 75 mm, and the edge thickness is 5 mm. The first condensing lens 11, the second condensing lens 21 and the third condensing lens 31 form the condensing system, the distance between the first condensing lens and the second colleting lens is 3 mm, the distance between the second condensing lens and the third condensing lens is 15 mm, and the distance between the third condensing lens and the fourth condensing lens is 50 mm, it can be conducted that condensing the 80% light flux of divergent light of single light bead into nearly parallel light with small divergence by shot combination with small diameter, and then condensing multiple nearly parallel light to the position near the focus point of the fourth condensing lens 4 by the fourth condensing lens 4, and achieving the combination of the beams of multiple light beads.

It can be seen from the above embodiments 4~6 that, three times of condensing are conducted uniformly and descendingly, the beam angle of 120 degree emitted by the LEDs is collected to 70-80 degree through the first condensing lens group 1 on the first time, collected to 30-40 degree through the second condensing lens group 2 on the second time, collected to within 20 degree through the third condensing lens group 3 on the third time, and collected near the focus point of the fourth condensing lens 4 at last, more than 60% of light are concentrated within the diameter range of 20 mm-60 mm, and more than 60% divergence angles of light are within 40 degree, suitable for depositing imaged object.

The flat LED light source is easier to process, the processing and installation accuracy requirements are not high, focusing can be conducted through the fourth condensing lens 4, focusing is quicker and easier; the heat dissipation of the flat LED light source is easy to conduct, with low cost; the optical efficiency is improved by 80%; light combining can be achieved within short distance and the combined light is even. As four 60 W LEDs for example, they can be used for zooming imaging system after focusing and combining, exited beam angle is zoomed from 12 degree to 40 degree, the average illuminance of 1 meter spot can reach 4500 Lx, but as for the same kind of lamp of the traditional HID light source, the average illuminance of 1 meter spot of 575 W is about 6500 Lx.

Embodiment 7

A multiple LED condensing and imaging system, including a light source, and imaging lens group disposed at front of the light source.

Light Source

As shown in FIG. 1 and FIG. 2, the light source is a flat light source, the flat light source includes a flat substrate, multiple LEDs 5 are distributed uniformly on the flat substrate. There are four LEDs 5 in the present embodiment. The four LEDs 5 are on the same plane to form the flat light source. A first condensing lens 11 is disposed at front of each LED 5, the first condensing lens 11 is aspherical lens, the conical coefficient is −0.85, the curvature radius is 4.5 mm, the diameter is 10 mm, the edge thickness is 1 mm, the three first condensing lenses 11 are on the same plane and form a first condensing lens group 1, conducting the first condensing on light emitted by LED. A second condensing lens 21 is disposed at front of each first condensing lens 11, the second condensing lens 21 is an ordinary spherical lens, its left curvature radius is 20 mm, right curvature radius is 8 mm, diameter is 10 mm, and edge thickness is 1 mm, and the three second condensing lenses 21 are on the same plane and form a second condensing lens group 2, conducting the second condensing on the light emitted by LED. A third condensing lens 31 is disposed at front of each second condensing lens 21 correspondingly, the third condensing lens 31 is a simple plano-convex lens, its curvature radius of convex is 40 mm, the diameter is 20 mm, and the edge thickness is 1 mm, and the three third condensing lenses 31 are on the same plane and form a third condensing lens group 3, conducting the third condensing on the light emitted by LED. A fourth condensing lens 4 is disposed at front of the third condensing lens group 3, the fourth condensing lens 4 is a non-Snell lens, the focal distance of the fourth condensing lens is 80 mm, the diameter is 65 mm, and the edge thickness is 1 mm. The first condensing lens 11, the second condensing lens 21 and the third condensing lens 31 form the condensing system, the distance between the first condensing lens and the second colleting lens is 0 mm, the distance between the second condensing lens and the third condensing lens is 8 mm, and the distance between the third condensing lens and the fourth condensing lens is 2 mm, it can be conducted that condensing the 80% light flux of divergent light of single light bead into nearly parallel light with small divergence by shot combination with small diameter, and then condensing multiple nearly parallel light to the position near the focus point of the fourth condensing lens 4 by the fourth condensing lens 4, and achieving the combination of the beams of multiple light beads.

Imaging Lens Group

As shown in FIG. 1, there arranged a first plano-convex lens 7, a second plano-convex lens 8, and a third plano-convex lens 9 on the direction of optical path sucessively.

The curvature radius of right convex of the first plano-convex lens 7 is 70 mm, with edge thickness of 1 mm, and diameter of 63 mm; The curvature radius of right convex of the second plano-convex lens 8 is 120 mm, with edge thickness of 1 mm, and diameter of 65 mm; The curvature radius of right convex of the third plano-convex lens 9 is 140 mm, with edge thickness of 1 mm, and diameter of 75 mm. The distance between the first plano-convex lens 7 and the second plano-convex lens 8 is 0 mm; the first plano-convex lens 7 and the second plano-convex lens 8 form a focusing lens group, and the focusing lens group is 25 mm behind the imaged object 4 in the system; the third plano-convex lens 9 is 150 mm behind the imaged object 4 in the system. The first plano-convex lens 7 and the second plano-convex lens 8 form a focusing lens group, using for focusing of system in the imaging system, and making the image outside 2 meters behind the shot clear; the structure of the shot of the whole imaging system is simple, costs less, and has clear image, and the range of the imaged object 4 is big, which can reach 60 mm and deposit many imaged object.

Embodiment 8

A multiple LED condensing and imaging system, including light source, and imaging lens group disposed at front of the light source.

Light Source

As shown in FIG. 1 and FIG. 2, the light source is flat light source, the flat light source includes a flat substrate, multiple LEDs 5 are distributed uniformly on the flat substrate. There are three LEDs 5 in the present embodiment. The three LEDs 5 are on the same plane to form the flat light source. A first condensing lens 11 is disposed at front of each LED 5, the first condensing lens 11 is aspherical lens, the conical coefficient is −0.7, the curvature radius is 7.0 mm, the diameter is 15 mm, the edge thickness is 3 mm, the three first condensing lenses 11 are on the same plane and form a first condensing lens group 1, conducting the first condensing on light emitted by LED. A second condensing lens 21 is disposed at front of each first condensing lens 11, the second condensing lens 21 is an ordinary spherical lens, its left curvature radius is 40 mm, right curvature radius is 14 mm, diameter is 15 mm, and edge thickness is 3 mm, and the three second condensing lenses 21 are on the same plane and form a second condensing lens group 2, conducting the second condensing on the light emitted by LED. A third condensing lens 31 is disposed at front of each second condensing lens 21 correspondingly, the third condensing lens 31 is a simple plano-convex lens, its curvature radius of convex is 60 mm, the diameter is 25 mm, and the edge thickness is 3 mm, and the three third condensing lenses 31 are on the same plane and form a third condensing lens group 3, conducting the third condensing on the light emitted by LED. A fourth condensing lens 4 is disposed at front of the third condensing lens group 3, the fourth condensing lens 4 is a non-Snell lens, the focal distance of the fourth condensing lens is 100 mm, the diameter is 70 mm, and the edge thickness is 3 mm. The first condensing lens 11, the second condensing lens 21 and the third condensing lens 31 form the condensing system, the distance between the first condensing lens and the second colleting lens is 1.5 mm, the distance between the second condensing lens and the third condensing lens is 12 mm, and the distance between the third condensing lens and the fourth condensing lens is 25 mm, it can be conducted that condensing the 80% light flux of divergent light of single light bead into nearly parallel light with small divergence by shot combination with small diameter, and then condensing multiple nearly parallel light to the position near the focus point of the fourth condensing lens 4 by the fourth condensing lens 4, and achieving the combination of the beams of multiple light beads.

Imaging Lens Group

As shown in FIG. 1, there arranged a first plano-convex lens 7, a second plano-convex lens 8, and a third plano-convex lens 9 on the direction of optical path sucessively. The curvature radius of right convex of the first plano-convex lens 7 is 80 mm, with edge thickness of 3 mm, and diameter of 68 mm; The curvature radius of right convex of the second plano-convex lens 8 is 130 mm, with edge thickness of 3 mm, and diameter of 70 mm; The curvature radius of right convex of the third plano-convex lens 9 is 150 mm, with edge thickness of 3 mm, and diameter of 80 mm. The distance between the first plano-convex lens 7 and the second plano-convex lens 8 is 1.5 mm; the first plano-convex lens 7 and the second plano-convex lens 8 form a focusing lens group, and the focusing lens group is 45 mm behind the imaged object 4 in the system; the third plano-convex lens 9 is 160 mm behind the imaged object 4 in the system. The first plano-convex lens 7 and the second plano-convex lens 8 form a focusing lens group, using for focusing of system in the imaging system, and making the image outside 2 meters behind the shot clear; the structure of the shot of the whole imaging system is simple, costs less, and has clear image, and the range of the imaged object 4 is big, which can reach 60 mm and deposit many imaged object.

Embodiment 9

A multiple LED condensing and imaging system, including light source, and imaging lens group disposed at front of the light source.

Light Source

As shown in FIG. 1 and FIG. 2, the light source is flat light source, the flat light source includes a flat substrate, multiple LEDs 5 are distributed uniformly on the flat substrate. There are three LEDs 5 in the present embodiment. The three LEDs 5 are on the same plane to form the flat light source. A first condensing lens 11 is disposed at front of each LED 5, the first condensing lens 11 is aspherical lens, the conical coefficient is −0.6, the curvature radius is 10 mm, the diameter is 20 mm, the edge thickness is 5 mm, the three first condensing lenses 11 are on the same plane and form a first condensing lens group 1, conducting the first condensing on light emitted by LED. A second condensing lens 21 is disposed at front of each first condensing lens 11, the second condensing lens 21 is an ordinary spherical lens, its left curvature radius is 60 mm, right curvature radius is 20 mm, diameter is 20 mm, and edge thickness is 5 mm, and the three second condensing lenses 21 are on the same plane and form a second condensing lens group 2, conducting the second condensing on the light emitted by LED. A third condensing lens 31 is disposed at front of each second condensing lens 21 correspondingly, the third condensing lens 31 is a simple plano-convex lens, its curvature radius of convex is 80 mm, the diameter is 30 mm, and the edge thickness is 5 mm, and the three third condensing lenses 31 are on the same plane and form a third condensing lens group 3, conducting the third condensing on the light emitted by LED. A fourth condensing lens 4 is disposed at front of the third condensing lens group 3, the fourth condensing lens 4 is a non-Snell lens, the focal distance of the fourth condensing lens is 120 mm, the diameter is 75 mm, and the edge thickness is 5 mm. The first condensing lens 11, the second condensing lens 21 and the third condensing lens 31 form the condensing system, the distance between the first condensing lens and the second colleting lens is 3 mm, the distance between the second condensing lens and the third condensing lens is 15 mm, and the distance between the third condensing lens and the fourth condensing lens is 50 mm, it can be conducted that condensing the 80% light flux of divergent light of single light bead into nearly parallel light with small divergence by shot combination with small diameter, and then condensing multiple nearly parallel light to the position near the focus point of the fourth condensing lens 4 by the fourth condensing lens 4, and achieving the combination of the beams of multiple light beads.

Imaging Lens Group

As shown in FIG. 1, there arranged a first plano-convex lens 7, a second plano-convex lens 8, and a third plano-convex lens 9 on the direction of optical path successively. The curvature radius of right convex of the first plano-convex lens 7 is 85 mm, with edge thickness of 5 mm, and diameter of 74 mm; The curvature radius of right convex of the second plano-convex lens 8 is 140 mm, with edge thickness of 5 mm, and diameter of 75 mm; The curvature radius of right convex of the third plano-convex lens 9 is 160 mm, with edge thickness of 5 mm, and diameter of 85 mm. The distance between the first plano-convex lens 7 and the second plano-convex lens 8 is 3 mm; the first plano-convex lens 7 and the second plano-convex lens 8 form a focusing lens group, and the focusing lens group is 60 mm behind the imaged object 4 in the system; the third plano-convex lens 9 is 170 mm behind the imaged object 4 in the system. The first plano-convex lens 7 and the second plano-convex lens 8 form a focusing lens group, using for focusing of system in the imaging system, and making the image outside 2 meters behind the shot clear; the structure of the shot of the whole imaging system is simple, costs less, and has clear image, and the range of the imaged object 4 is big, which can reach 60 mm and deposit many imaged object.

It can be seen from the above embodiments 7~9 that, three times of condensing are conducted uniformly and descendingly, the beam angle of 120 degree emitted by the LEDs is collected to 70-80 degree through the first condensing lens group 1 on the first time, collected to 30-40 degree through the second condensing lens group 2 on the second time, collected to within 20 degree through the third condensing lens group 3 on the third time, and collected near the focus point of the fourth condensing lens 4 at last, more than 60% of light are concentrated within the diameter range of 20 mm-60 mm, and more than 60% divergence angles of light are within 40 degree, suitable for depositing imaged object. The efficiency of the imaging system formed by the light source and the imaging lens group is high, can focus, the image is clear, and using high-power LED as light source costs low.

Embodiment 10

A multiple LED condensing and imaging system, including light source, and imaging lens group disposed at front of the light source.

Light Source

As shown in FIG. 1 and FIG. 2, the light source is flat light source, the flat light source includes a flat substrate, multiple LEDs 5 are distributed uniformly on the flat substrate. There are four LEDs 5 in the present embodiment. The four LEDs 5 are on the same plane to form the flat light source. A first condensing lens 11 is disposed at front of each LED 5, the first condensing lens 11 is aspherical lens, the conical coefficient is −0.85, the curvature radius is 4.5 mm, the diameter is 10 mm, the edge thickness is 1 mm, the four condensing lenses 11 are on the same plane and form a first condensing lens group 1, conducting the first condensing on light emitted by LED. A second condensing lens 21 is disposed at front of each first condensing lens 11, the second condensing lens 21 is an ordinary spherical lens, its left curvature radius is 20 mm, right curvature radius is 8 mm, diameter is 10 mm, and edge thickness is 1 mm, and the four second condensing lenses 21 are on the same plane and form a second condensing lens group 2, conducting the second condensing on the light emitted by LED. A third condensing lens 31 is disposed at front of each second condensing lens 21 correspondingly, the third condensing lens 31 is a simple plano-convex lens, its curvature radius of convex is 40 mm, the diameter is 20 mm, and the edge thickness is 1 mm, and the three third condensing lenses 31 are on the same plane and form a third condensing lens group 3, conducting the third condensing on the light emitted by LED. A fourth condensing lens 4 is disposed at front of the third condensing lens group 3, the fourth condensing lens 4 is a non-Snell lens, the focal distance of the fourth condensing lens is 80 mm, the diameter is 65 mm, and the edge thickness is 1 mm. The first condensing lens 11, the second condensing lens 21 and the third condensing lens 31 form the condensing system, the distance between the first condensing lens and the second colleting lens is 0 mm, the distance between the second condensing lens and the third condensing lens is 8 mm, and the distance between the third condensing lens and the fourth condensing lens is 2 mm, it can be conducted that condensing the 80% light flux of divergent light of single light bead into nearly parallel light with small divergence by shot combination with small diameter, and then condensing multiple nearly parallel light to the position near the focus point of the fourth condensing lens 4 by the fourth condensing lens 4, and achieving the combination of the beams of multiple light beads.

Imaging Lens Group

As shown in FIG. 1, there arranged a first plano-convex lens 12, a glued lens 13, double convex lens 14, double concave lens 15, and a second plano-convex lens 16 according to the optical path successively. The curvature radius of the right convex of the first plano-convex lens 12 is 60 mm, with diameter of 65 mm, and edge thickness of 1 mm. As to the glued lens 13, the curvature radius of the left convex is 400 mm, the curvature radius of the middle convex is 57 mm, the curvature radius of the right convex is 200 mm, and the diameter is 65 mm. As to the double convex lens 14, the curvature radius of the left convex is 85 mm, the curvature radius of the right convex is 550 mm, the diameter is 65 mm, and the edge thickness is 1 mm. As to the double concave lens 15, the curvature radius of the left concave is 110, the curvature radius of the right convex is 300 mm, the diameter is 65 mm, and the thickness of the center is 2 mm. The curvature radius of the right convex of the second plano-convex lens 16 is 100 mm, the diameter is 115 mm, and the edge thickness is 1 mm. The distance between the first plano-convex lens 12 and the glued lens 13 is 0 mm, the distance between the glued 13 and the double convex lens 14 is 0 mm; The first plano-convex lens 12, the glued lens 13, and the double convex lens 14 form a focusing lens group, the focusing lens group is 30 mm behind the imaged object 6, the double concave lens 15 is 120 mm behind the imaged object 6, and the second plano-convex lens 16 is 210 mm behind the imaged object 6. The glued lens 13 is used for reduce the aberration of system, the focusing lens group is used for focusing of system in the imaging system, and the double concave lens 15 is used for removing the aberration of system and achieving zooming. The range of the imaged object 6 of system is big, which can reach 70 mm and deposit many imaged object 6; the system has large range of zooming function, makes the image of the imaged object 6 clear at any distance outside 1 meter behind the shot, and costs less.

Embodiment 11

A multiple LED condensing and imaging system, including light source, and imaging lens group disposed at front of the light source.

Light Source

As shown in FIG. 1 and FIG. 2, the light source is flat light source, the flat light source includes a flat substrate, multiple LEDs 5 are distributed uniformly on the flat substrate. There are four LEDs 5 in the present embodiment. The four LEDs 5 are on the same plane to form the flat light source. A first condensing lens 11 is disposed at front of each LED 5, the first condensing lens 11 is aspherical lens, the conical coefficient is −0.7, the curvature radius is 7.0 mm, the diameter is 15 mm, the edge thickness is 3 mm, the four first condensing lenses 11 are on the same plane and form a first condensing lens group 1, conducting the first condensing on light emitted by LED. A second condensing lens 21 is disposed at front of each first condensing lens 11, the second condensing lens 21 is an ordinary spherical lens, its left curvature radius is 40 mm, right curvature radius is 14 mm, diameter is 15 mm, and edge thickness is 3 mm, and the four second condensing lenses 21 are on the same plane and form a second condensing lens group 2, conducting the second condensing on the light emitted by LED. A third condensing lens 31 is disposed at front of each second condensing lens 21 correspondingly, the third condensing lens 31 is a simple plano-convex lens, its curvature radius of convex is 60 mm, the diameter is 25 mm, and the edge thickness is 3 mm, and the three third condensing lenses 31 are on the same plane and form a third condensing lens group 3, conducting the third condensing on the light emitted by LED. A fourth condensing lens 4 is disposed at front of the third condensing lens group 3, the fourth condensing lens 4 is a non-Snell lens, the focal distance of the fourth condensing lens is 100 mm, the diameter is 70 mm, and the edge thickness is 3 mm. The first condensing lens 11, the second condensing lens 21 and the third condensing lens 31 form the condensing system, the distance between the first condensing lens and the second colleting lens is 1.5 mm, the distance between the second condensing lens and the third condensing lens is 12 mm, and the distance between the third condensing lens and the fourth condensing lens is 25 mm, it can be conducted that condensing the 80% light flux of divergent light of single light bead into nearly parallel light with small divergence by shot combination with small diameter, and then condensing multiple nearly parallel light to the position near the focus point of the fourth condensing lens 4 by the fourth condensing lens 4, and achieving the combination of the beams of multiple light beads.

Imaging Lens Group

As shown in FIG. 1, there arranged a first plano-convex lens 12, a glued lens 13, double convex lens 14, double concave lens 15 and a second plano-convex lens 16 according to the optical path successively. The curvature radius of the right convex of the first plano-convex lens 12 is 65 mm, with diameter of 70 mm, and edge thickness of 3 mm. As to the glued lens 13, the curvature radius of the left convex is 410 mm, the curvature radius of the middle convex is 58.5 mm, the curvature radius of the right convex is 220 mm, and the diameter is 70 mm. As to the double convex lens 14, the curvature radius of the left convex is 90 mm, the curvature radius of the right convex is 565 mm, the diameter is 70 mm, and the edge thickness is 3 mm. As to the double concave lens 15, the curvature radius of the left concave is 120, the curvature radius of the right convex is 315 mm, the diameter is 70 mm, and the thickness of the center is 3.5 mm. The curvature radius of the right convex of the second plano-convex lens 16 is 115 mm, the diameter is 120 mm, and the edge thickness is 3 mm. The distance between the first plano-convex lens 12 and the glued lens 13 is 1.5 mm, the distance between the glued 13 and the double convex lens 14 is 1.5 mm; The first plano-convex lens 12, the glued lens 13, and the double convex lens 14 form a focusing lens group, the focusing lens group is 65 mm behind the imaged object 6, the double concave lens 15 is 155 mm behind the imaged object 6, and the second plano-convex lens 16 is 220 mm behind the imaged object 6. The glued lens 13 is used for reduce the aberration of system, the focusing lens group is used for focusing of system in the imaging system, and the double concave lens 15 is used for removing the aberration of system and achieving zooming. The range of the imaged object 6 of system is big, which can reach 70 mm and deposit many imaged object 6; the system has large range of zooming function, makes the image of the imaged object 6 clear at any distance outside 1 meter behind the shot, and costs less.

Embodiment 12

A multiple LED condensing and imaging system, including light source, and imaging lens group disposed at front of the light source.

Light Source

As shown in FIG. 1 and FIG. 2, the light source is flat light source, the flat light source includes a flat substrate, multiple LEDs 5 are distributed uniformly on the flat substrate. There are four LEDs 5 in the present embodiment. The four LEDs 5 are on the same plane to form the flat light source. A first condensing lens 11 is disposed at front of each LED 5, the first condensing lens 11 is aspherical lens, the conical coefficient is −0.6, the curvature radius is 10 mm, the diameter is 20 mm, the edge thickness is 5 mm, the four first condensing lenses 11 are on the same plane and form a first condensing lens group 1, conducting the first condensing on light emitted by LED. A second condensing lens 21 is disposed at front of each first condensing lens 11, the second condensing lens 21 is an ordinary spherical lens, its left curvature radius is 60 mm, right curvature radius is 20 mm, diameter is 20 mm, and edge thickness is 5 mm, and the four second condensing lenses 21 are on the same plane and form a second condensing lens group 2, conducting the second condensing on the light emitted by LED. A third condensing lens 31 is disposed at front of each second condensing lens 21 correspondingly, the third condensing lens 31 is a simple plano-convex lens, its curvature radius of convex is 80 mm, the diameter is 30 mm, and the edge thickness is 5 mm, and the three third condensing lenses 31 are on the same plane and form a third condensing lens group 3, conducting the third condensing on the light emitted by LED. A fourth condensing lens 4 is disposed at front of the third condensing lens group 3, the fourth condensing lens 4 is a non-Snell lens, the focal distance of the fourth condensing lens is 120 mm, the diameter is 75 mm, and the edge thickness is 5 mm. The first condensing lens 11, the second condensing lens 21 and the third condensing lens 31 form the condensing system, the distance between the first condensing lens and the second colleting lens is 3 mm, the distance between the second condensing lens and the third condensing lens is 15 mm, and the distance between the third condensing lens and the fourth condensing lens is 50 mm, it can be conducted that condensing the 80% light flux of divergent light of single light bead into nearly parallel light with small divergence by shot combination with small diameter, and then condensing multiple nearly parallel light to the position near the focus point of the fourth condensing lens 4 by the fourth condensing lens 4, and achieving the combination of the beams of multiple light beads.

Imaging Lens Group

As shown in FIG. 1, there arranged a first plano-convex lens 12, a glued lens 13, double convex lens 14, double concave lens 15, and a second plano-convex lens 16 according to the optical path successively. The curvature radius of the right convex of the first plano-convex lens 12 is 70 mm, with diameter of 75 mm, and edge thickness of 5 mm. As to the glued lens 13, the curvature radius of the left convex is 420 mm, the curvature radius of the middle convex is 60 mm, the curvature radius of the right convex is 240 mm, and the diameter is 75 mm. As to the double convex lens 14, the curvature radius of the left convex is 95 mm, the curvature radius of the right convex is 580 mm, the diameter is 75 mm, and the edge thickness is 5 mm. As to the double concave lens 15, the curvature radius of the left concave is 130, the curvature radius of the right convex is 330 mm, the diameter is 75 mm, and the thickness of the center is 5 mm. The curvature radius of the right convex of the second plano-convex lens 16 is 130 mm, the diameter is 125 mm, and the edge thickness is 5 mm. The distance between the first plano-convex lens 12 and the glued lens 13 is 3 mm, the distance between the glued 13 and the double convex lens 14 is 3 mm; The first plano-convex lens 12, the glued lens 13, and the double convex lens 14 form a focusing lens group, the focusing lens group is 100 mm behind the imaged object 6, the double concave lens 15 is 190 mm behind the imaged object 6, and the second plano-convex lens 16 is 230 mm behind the imaged object 6. The glued lens 13 is used for reduce the aberration of system, the focusing lens group is used for focusing of system in the imaging system, and the double concave lens 15 is used for removing the aberration of system and achieving zooming. The range of the imaged object 6 of system is big, which can reach 70 mm and deposit many imaged object 6; the system has large range of zooming function, makes the image of the imaged object 6 clear at any distance outside 1 meter behind the shot, and costs less.

It can be seen from the above embodiments 10~12 that, three times of condensing are conducted uniformly and descendingly, the beam angle of 120 degree emitted by the LEDs is collected to 70-80 degree through the first condensing lens group 1 on the first time, collected to 30-40 degree through the second condensing lens group 2 on the second time, collected to within 20 degree through the third condensing lens group 3 on the third time, and collected near the focus point of the fourth condensing lens 4 at last, more than 60% of light are concentrated within the diameter range of 20 mm-60 mm, and more than 60% divergence angles of light are within 40 degree, suitable for depositing imaged object. The imaging system formed by the light source and the imaging lens group has large range of zooming function, can make the image of imaged object clear at any distance outside 1 meter behind the shot, costs less, has high efficiency, has clear image, can zoom and focus, and using high-power LED as light source costs low.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present invention is defined by the appended claims rather than the foregoing description and the exemplary embodiments described therein.

The invention claimed is:

1. A multiple light-emitting diode(LED) condensing system, comprising:
   a light source, comprising a flat substrate and a plurality of LEDs disposed on the flat substrate;
   a plurality of first condensing lenses, wherein each of the first condensing lenses is disposed at a front of corresponding one of the LEDs, wherein all of the first condensing lenses form a first condensing lens group;
   a plurality of second condensing lenses, wherein each of the second condensing lenses is disposed at a front of corresponding one of the first condensing lenses, wherein all of the second condensing lenses form a second condensing lens group;
   a plurality of third condensing lenses, wherein each of the third condensing lenses is disposed at a front of corresponding one of the second condensing lenses, wherein all of the third condensing lenses form a third condensing lens group; and
   a fourth condensing lens disposed at a front of the third condensing lens group,
   wherein the multiple LED condensing system is configured such that light flux of the plurality of LEDs passes through the first, second and third condensing lenses and forms a substantially parallel light.

2. The multiple LED condensing system as claimed in claim 1, characterized in that each of the first condensing lenses is an aspherical lens having a conical coefficient of −0.85 to −0.6, a curvature radius of 4.5 to 10 mm, and a diameter of 10 to 20 mm.

3. The multiple LED condensing system as claimed in claim 1, characterized in that each of the second condensing lenses is an ordinary spherical lens having a left convex curvature radius of 20~60 mm, a right convex curvature radius of 8~20 mm, and a diameter of 10~20 mm.

4. The multiple LED condensing system as claimed in claim 1, characterized in that each of the third condensing lenses is a simple plano-convex lens having a convex curvature radius of 40~80 mm, and a diameter of 20~30 mm.

5. The multiple LED condensing system as claimed in claim 1, characterized in that the fourth condensing lens has a focal length of 80~120 mm, and a diameter of 65~75 mm.

6. The multiple LED condensing system as claimed in claim 1, characterized in that a distance between the first condensing lens and the second condensing lens is 0~3 mm.

7. The multiple LED condensing system as claimed in claim 1, characterized in that a distance between the second condensing lens and the third condensing lens is 8~15 mm.

8. The multiple LED condensing system as claimed in claim 1, characterized in that a distance between the third condensing lens and the fourth condensing lens is 2~50 mm.

9. The multiple LED condensing system as claimed in claim 1, characterized in that an edge thickness of each of the first, second, third, and fourth condensing lenses is 1~5 mm.

10. A multiple light-emitting diode(LED) condensing method, comprising:
- disposing a plurality of LEDs on a same plane;
- disposing each of a plurality of first condensing lenses respectively at front of corresponding one of the LEDs, wherein all of the first condensing lenses form a first condensing lens group;
- disposing each of a plurality of second condensing lenses respectively at front of corresponding one of the first condensing lenses, wherein all of the second condensing lenses form a second condensing lens group;
- disposing each of a plurality of third condensing lenses respectively at front of corresponding one of the second condensing lenses, wherein all of the third condensing lenses form a third condensing lens group; and
- disposing a fourth condensing lens at front of the third condensing lens group;
- wherein light emitted by each LED is condensed by the corresponding first, second and third condensing lenses, and the divergence angle of the light becomes smaller, forming a bunch of nearly parallel light beams, and the bunches of nearly parallel light beams simultaneously transmit through the fourth condensing lens and combine such that more than 60% of light is condensed within a diameter range of 20 mm~60 mm near a focus point of the fourth condensing lens, and more than 60% of the divergence angle of the light is under 40 degree.

11. The multiple LED condensing method as claimed in claim 10, characterized in that all of the LEDs are disposed on a flat substrate.

12. The multiple LED condensing method as claimed in claim 10, characterized in that each of the first condensing lenses is an aspherical lens, wherein all of the first condensing lenses are on a first plane, and the first condensing lens group conducts a first condensing of the light emitted by the LEDs.

13. The multiple LED condensing method as claimed in claim 10, characterized in that each of the second condensing lenses is a spherical lens, wherein all of the second condensing lenses are on a second plane, and the second condensing lens group conducts a second condensing of the light emitted by the LEDs.

14. The multiple LED condensing method as claimed in claim 10, characterized in that each of the third condensing lenses is an spherical lens, wherein all of the third condensing lenses are on a third plane, and the third condensing lens group conducts a third condensing of the light emitted by the LEDs.

15. The multiple LED condensing method as claimed in claim 10, characterized in that the fourth condensing lens is a positive lens, wherein the fourth condensing lens converges the bunches of nearly parallel light beams being condensed for three times to the focus point of the fourth condensing lens.

16. The multiple LED condensing method as claimed in claim 10, characterized in that the LEDs are distributed uniformly to form a multi-point flat light source.

17. A multiple LED condensing and imaging system with function of focusing, comprising a light source and an imaging lens group disposed at front of the light source, and characterized in that:
- the light source comprises:
  - a flat substrate;
  - a plurality of LEDs disposed on the flat substrate;
  - a plurality of first condensing lenses, wherein each of the first condensing lenses is disposed at a front of corresponding one of the LEDs, wherein all of the first condensing lenses form a first condensing lens group;
  - a plurality of second condensing lenses, wherein each of the second condensing lenses is disposed at a front of corresponding one of the first condensing lens, wherein all of the second condensing lenses form a second condensing lens group;
  - a plurality of third condensing lenses, wherein each of the third condensing lenses is disposed at a front of corresponding one of the second condensing lenses, wherein all of the third condensing lenses form a third condensing lens group; and
  - a fourth condensing lens disposed at front of the third condensing lens group;
- the imaging lens group comprises, along a direction of optical path, a first plano-convex lens, a second plano-convex lens and a third plano-convex lens; and
- the light source is configured such that light flux of the plurality of LEDs passes through the first, second and third condensing lenses and forms a substantially parallel light.

18. The multiple LED condensing and imaging system with function of focusing as claimed in claim 17, characterized in that, each of the first condensing lenses is an aspherical lens having a conical coefficient of −0.85 to −0.6, a curvature radius of 4.5 to 10 mm, and a diameter of 10 to 20 mm; each of the second condensing lenses is an ordinary spherical lens having a left convex curvature radius of 20~60 mm, a right convex curvature radius of 8~20 mm, and a diameter of 10~20 mm; each of the third condensing lenses is a simple plano-convex lens having a convex curvature radius of 40~80 mm, and a diameter of 20~30 mm; and the fourth condensing lens has a focal length of 80~120 mm, and a diameter of 65~75 mm.

19. The multiple LED condensing and imaging system with function of focusing as claimed in claim 17, characterized in that, a distance between the first condensing lens and the second condensing lens is 0~3 mm; a distance between the second condensing lens and the third condensing lens is 8~15 mm; and a distance between the third condensing lens and the fourth condensing lens is 2~50 mm.

20. The multiple LED condensing and imaging system with function of focusing as claimed in claim 17, characterized in that, the first plano-convex lens has a right convex curvature radius of 70~85 mm, and a diameter of 63~74 mm; the second plano-convex lens has a right convex curvature radius of 120~140 mm, and a diameter of 65~75 mm; the third plano-convex lens has a right convex curvature radius of 140~160 mm, and a diameter of 75~85 mm.

21. The multiple LED condensing and imaging system with function of focusing as claimed in claim 17, characterized in that, a distance between the first plano-convex lens and the second plano-convex lens is 0~3 mm; the first plano-convex lens and the second plano-convex lens form a focusing lens group, and the focusing lens group is 25~60 mm behind the imaged object in the system; and the third plano-convex lens is 150~170 mm behind the imaged object in the system.

22. The multiple LED condensing and imaging system with function of focusing as claimed in claim 17, characterized in that, an edge thickness of each of the first condensing lenses, the second condensing lenses, the third condensing lenses, the fourth condensing lens, the first plano-convex lens, the second plano-convex lens, and the third plano-convex lens are 1~5 mm.

23. A multiple LED condensing and imaging system with function of zooming, comprising a light source and an imaging lens group disposed at front of the light source, and characterized in that:
the light source comprises:
a flat substrate;
a plurality of LEDs disposed on the flat substrate;
a plurality of first condensing lenses, wherein each of the first condensing lenses is disposed at front of corresponding one of the LEDs, wherein all of the first condensing lenses form a first condensing lens group;
a plurality of second condensing lenses, wherein each of the second condensing lenses is disposed at a front of corresponding one of the first condensing lens, wherein all of the second condensing lenses form a second condensing lens group;
a plurality of third condensing lenses, wherein each of the third condensing lenses is disposed at a front of corresponding one of the second condensing lenses, wherein all of the third condensing lenses form a third condensing lens group; and
a fourth condensing lens disposed at front of the third condensing lens group;
the imaging lens group comprises, along a direction of optical path, a first plano-convex lens, a glued lens, a double convex lens, a double concave lens, and a second plano-convex lens; and
the light source is configured such that light flux of the plurality of LEDs passes through the first, second and third condensing lenses and forms a substantially parallel light.

24. The multiple LED condensing and imaging system with function of zooming as claimed in claim 23, characterized in that, each of the first condensing lensesis an aspherical lens, having a conical coefficient of −0.85~−0.6, a curvature radius of 4.5~10 mm, and a diameter of 10~20 mm; each of the second condensing lenses is an ordinary spherical lens, having a left convex curvature radius of 20~60 mm, a right convex curvature radius of 8~20 mm, and a diameter of 10~20 mm; each of the third condensing lenses is a simple plano-convex lens, having a convex curvature radius of 40 to 80 mm, and a diameter of 20 to 30 mm; and the fourth condensing lens has a focal length of 80~120 mm, and a diameter of 65~75 mm.

25. The multiple LED condensing and imaging system with function of zooming as claimed in claim 23, characterized in that, a distance between the first condensing lens and the second condensing lens is 0~3 mm; a distance between the second condensing lens and the third condensing lens is 8~15 mm; and a distance between the third condensing lens and the fourth condensing lens is 2~50 mm.

26. The multiple LED condensing and imaging system with function of zooming as claimed in claim 23, characterized in that, the first plano-convex lens has a right convex curvature radius of 60~70 mm, and a diameter of 65~75 mm; the glued lens has a left convex curvature radius of 400~420 mm, a middle convex curvature radius of 57~60 mm, a right convex curvature radius of 200~240 mm, and a diameter of 65~75 mm; the double convex lens has a left convex curvature radius of 85~95 mm, a right convex curvature radius of 550~580 mm, and a diameter of 65~75 mm; the double concave lens has a left concave curvature radius of 110~130 mm, a right convex curvature radius of 300~330 mm, a diameter of 65~75 mm, and a center thickness of 2~5 mm; the second plano-convex lens has a right convex curvature radius of 100~130 mm, and a diameter of 115~125 mm.

27. The multiple LED condensing and imaging system with function of zooming as claimed in claim 23, characterized in that, a distance between the first plano-convex lens and the glued lens is 0~3 mm; the first plano-convex lens, the glued lens, and the double convex lens form a focusing lens group, the focusing lens group is 30~100 mm behind the imaged object, the double concave lens is 120~190 mm behind the imaged object, and the second plano-convex lens is 210~230 mm behind the imaged object.

28. The multiple LED condensing and imaging system with function of zooming as claimed in claim 23, characterized in that, an edge thickness of each of the first condensing lenses, the second condensing lenses, the third condensing lenses, the fourth condensing lens, the first plano-convex lens, the double convex lens, and the second plano-convex lens is 1~5 mm.

* * * * *